United States Patent
Uno et al.

(10) Patent No.: US 12,169,008 B2
(45) Date of Patent: Dec. 17, 2024

(54) DISK BRAKE

(71) Applicant: Hitachi Astemo, Ltd., Ibaraki (JP)

(72) Inventors: Miyuki Uno, Hitachinaka (JP); Junichi Hashimoto, Hitachinaka (JP); Shinji Suzuki, Hitachinaka (JP); Yoshihiro Iwama, Tokyo (JP); Masaru Oda, Tokyo (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 347 days.

(21) Appl. No.: 17/639,427

(22) PCT Filed: Nov. 26, 2020

(86) PCT No.: PCT/JP2020/043942
§ 371 (c)(1),
(2) Date: Mar. 1, 2022

(87) PCT Pub. No.: WO2021/106980
PCT Pub. Date: Jun. 3, 2021

(65) Prior Publication Data
US 2022/0299077 A1    Sep. 22, 2022

(30) Foreign Application Priority Data
Nov. 27, 2019   (JP) ................. 2019-214062

(51) Int. Cl.
*F16D 65/00*    (2006.01)
*B60T 1/06*     (2006.01)
(Continued)

(52) U.S. Cl.
CPC .......... *F16D 65/0056* (2013.01); *B60T 1/065* (2013.01); *F16D 55/226* (2013.01);
(Continued)

(58) Field of Classification Search
CPC ..... B60T 1/065; F16D 55/226; F16D 65/0068
See application file for complete search history.

(56) References Cited

U.S. PATENT DOCUMENTS

| | | | |
|---|---|---|---|
| 4,993,519 A * | 2/1991 | Thioux | F16D 55/2265 188/73.34 |
| 5,188,202 A * | 2/1993 | Terashima | F16D 65/0977 188/73.32 |

(Continued)

FOREIGN PATENT DOCUMENTS

| | | | | |
|---|---|---|---|---|
| EP | 455299 A | * | 11/1991 | ........... F16D 55/226 |
| JP | 2008-138752 A | | 6/2008 | |
| JP | 2018-119622 A | | 8/2018 | |

OTHER PUBLICATIONS

International Search Report received in corresponding International Application No. PCT/JP2020/043942 dated Feb. 2, 2021.

(Continued)

*Primary Examiner* — Melanie Torres Williams
(74) *Attorney, Agent, or Firm* — MATTINGLY & MALUR, PC

(57) ABSTRACT

This disk brake includes an attachment member that has support portions movably supporting a pair of brake pads, and a caliper that pressurizes the brake pads against a disk. The attachment member has outer circumferential frame portions, a coupling beam portion, and support main body portions. The outer circumferential frame portions extend in a disk circumferential direction so as to cover the disk while straddling the disk. The coupling beam portion couples the support portions to each other. The support main body portions form the support portions. The outer frame constituting portions constitute the outer frames of the support main body portions. Positions of disk-axially outward side end surfaces in a disk axial direction are the same as (Continued)

positions of the disk-axially outward side end surfaces of the caliper or on sides outward in the disk axial direction.

1 Claim, 12 Drawing Sheets

(51) Int. Cl.
    *F16D 55/226*     (2006.01)
    *F16D 55/00*     (2006.01)

(52) U.S. Cl.
    CPC .. F16D 65/0068 (2013.01); *F16D 2055/0008* (2013.01); *F16D 2055/0016* (2013.01)

(56) References Cited

U.S. PATENT DOCUMENTS

2013/0133990 A1*   5/2013   Suzuki ................. F16D 55/227
                                                                  188/73.39
2018/0172095 A1*   6/2018   Bhatti ................. F16D 65/0977

OTHER PUBLICATIONS

Written Opinion received in corresponding International Application No. PCT/JP2020/043942 dated Feb. 2, 2021.

* cited by examiner

DISK BRAKE

TECHNICAL FIELD

The present invention relates to a disk brake.

This application is based upon and claims the benefit of priority from Japanese Patent Application No. 2019-214062, filed Nov. 27, 2019, the content of which is incorporated herein by reference.

BACKGROUND ART

A disk brake having a structure in which a caliper pressurizing brake pads against a disk is movably supported by an attachment member supporting the brake pads is known (for example, refer to Patent Literature 1).

CITATION LIST

Patent Literature

[Patent Literature 1]
Japanese Unexamined Patent Application, First Publication No. 2008-138752

SUMMARY OF INVENTION

Technical Problem

In a disk brake having a floating-type caliper in the related art, a step is provided between an attachment member and the caliper on a front surface thereof, and a spring pad protrudes from the front surface of the attachment member. For this reason, when snow intrudes into a wheel, there is a likelihood that snow will coagulate around the protrusion portion so that a function may be inhibited or the snow may collide therewith leading to deformation. Regarding a technology in the related art, there is also a disk brake having a part that partially guards a spring pad. However, it is insufficient because snow may enter from parts around the guard.

The present invention provides a disk brake in which an influence of snow can be reduced.

Solution to Problem

According to an aspect of the present invention, a disk brake includes an attachment member that has support portions movably supporting a pair of brake pads and is attached to a non-rotation portion of a vehicle, and a caliper that is supported by the attachment member so as to be capable of moving in a disk axial direction and pressurizes the brake pads against a disk. The attachment member has outer circumferential frame portions and a beam portion. The outer circumferential frame portions extend in a disk circumferential direction respectively from facing surfaces facing disk-circumferentially outward side surfaces of the caliper so as to cover the disk while straddling the disk. The beam portion couples the support portions to each other on disk-axially outward sides. Support main body portions having the outer circumferential frame portions and the coupling beam portion as parts of outer frames and forming the support portions are provided on the disk-axially outward sides. Outer frame constituting portions constitute the outer frames of the support main body portions of the outer circumferential frame portions and the coupling beam portion. In the outer frame constituting portions, positions of disk-axially outward side end surfaces in the disk axial direction are the same as positions of the disk-axially outward side end surfaces of the caliper or on sides outward in the disk axial direction from the disk-axially outward side end surfaces of the caliper.

Advantageous Effects of Invention

According to the foregoing disk brake, an influence of snow can be reduced.

DESCRIPTION OF EMBODIMENT

An embodiment of the present invention will be described below with reference to the drawings. A disk brake 10 of the embodiment is used in a vehicle such as an automobile and the like and applies a brake force to the vehicle. Specifically, it is used as a front-wheel brake of a four-wheeled car. As illustrated in FIGS. 1 to 7, the disk brake 10 brakes a vehicle by stopping rotation of a disk 11 that has a circular plate shape and rotates together with a wheel (not illustrated). Hereinafter, description will be given based on a state in which the disk brake 10 is attached a vehicle.

In the following description, an extending direction of a center axis of the disk 11 will be referred to as a disk axial direction. A radial direction of the disk 11 will be referred to as a disk radial direction. A circumferential direction, namely, a rotation direction of the disk 11 will be referred to as a disk circumferential direction.

A center side of the disk 11 in the disk radial direction will be referred to as a disk-radially inward side. A side opposite to the center of the disk 11 in the disk radial direction will be referred to as a disk-radially outward side.

An outward side of the vehicle in the disk axial direction will be referred to as a disk-axially outward side. An inward side of the vehicle in the disk axial direction will be referred to as a disk-axially inward side.

An entrance side of the disk 11 in a rotation direction R at the time of forward movement of the vehicle will be referred to as a disk entry side. An exit side of the disk 11 in the rotation direction R at the time of forward movement of the vehicle will be referred to as a disk exit side.

Figure 1:
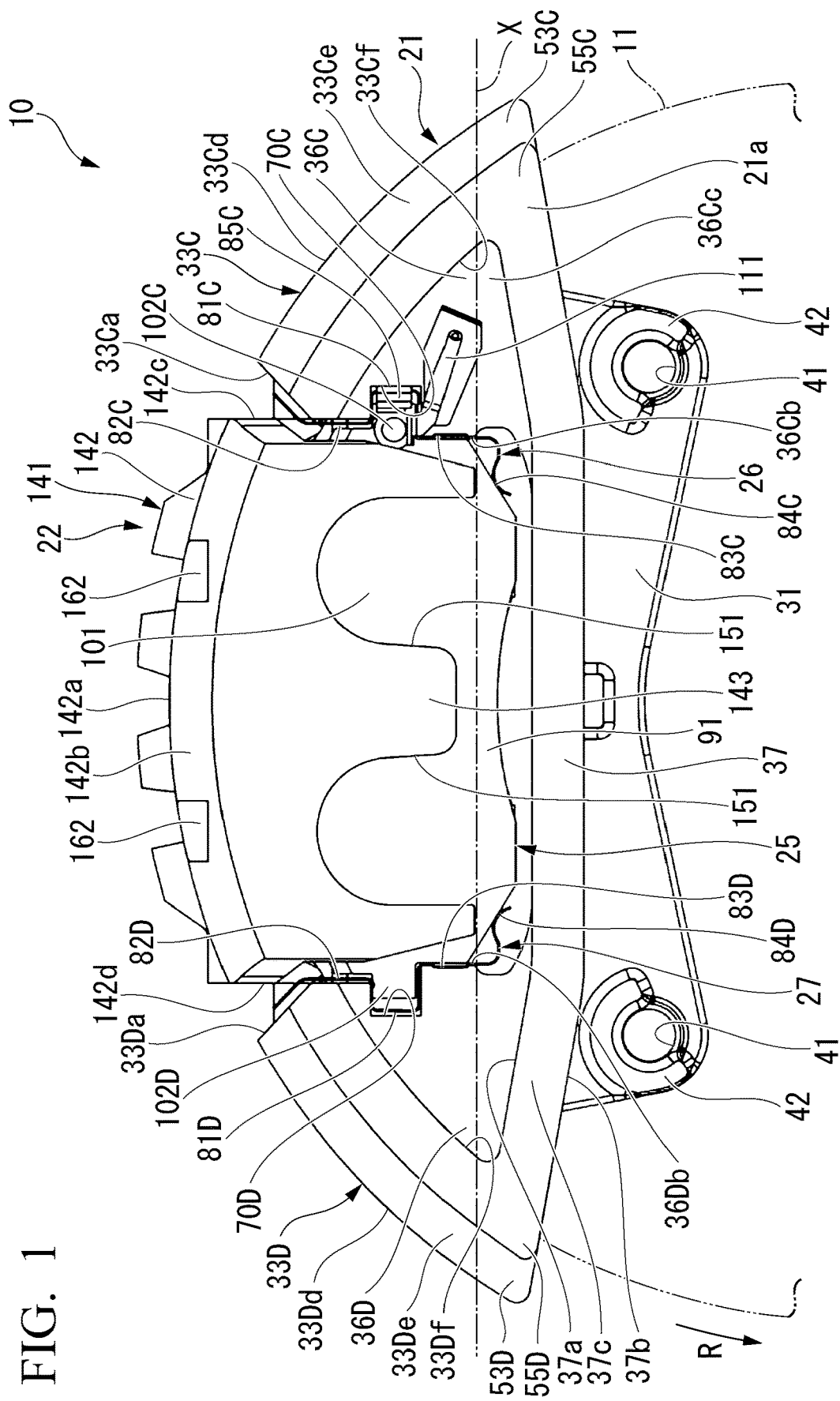
FIG. 1 is a front view illustrating a disk brake according to the embodiment of the present invention.
Figure 2:
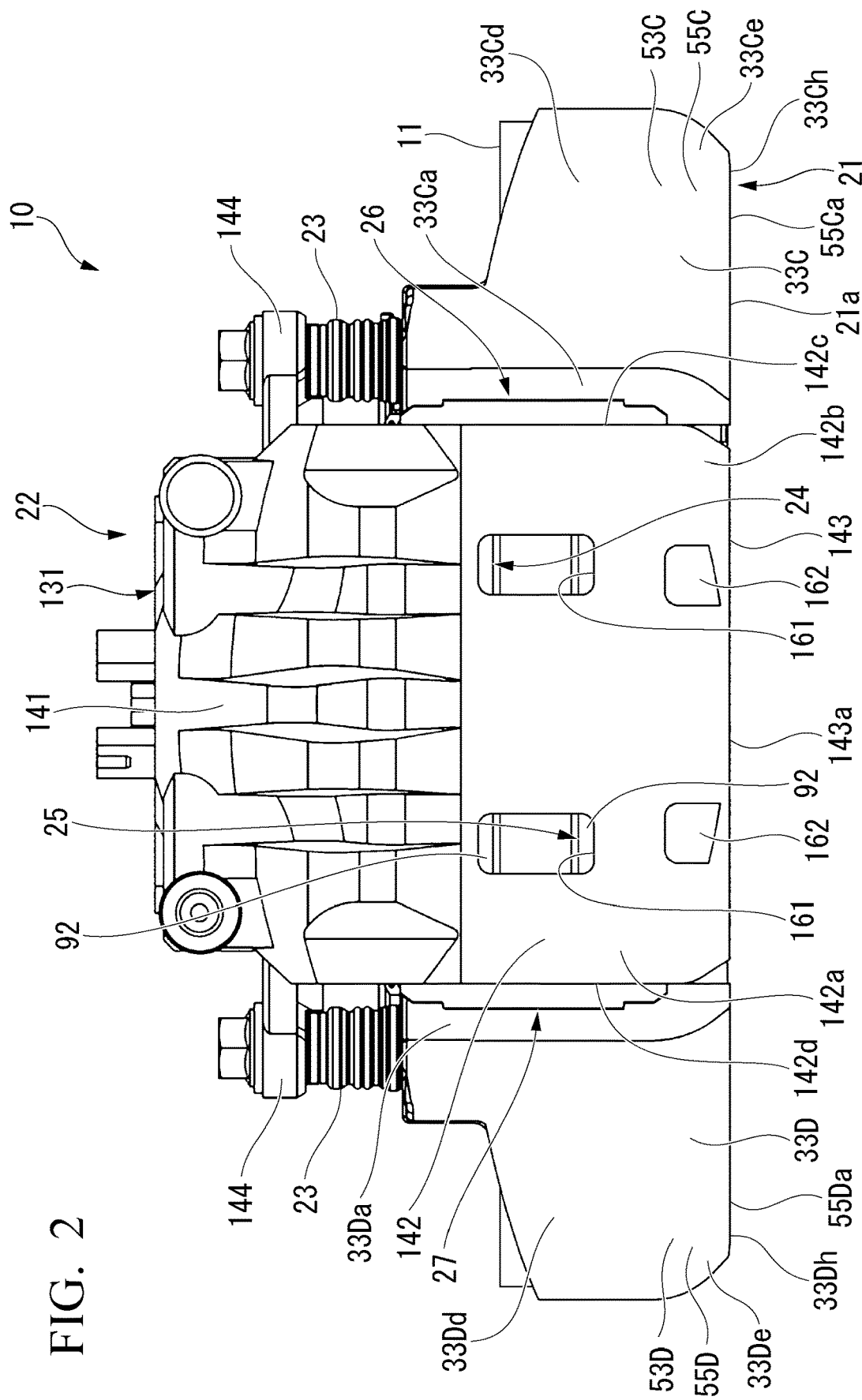
FIG. 2 is a plan view illustrating the disk brake according to the embodiment of the present invention.

As illustrated in FIGS. 1 to 7, the disk brake 10 includes an attachment member 21 and a caliper 22. As illustrated in FIG. 2, the disk brake 10 includes a pair of boots 23, a pair of brake pads 24 and 25, a pad spring 26 on the disk entry side, and a pad spring 27 on the disk exit side.

Figure 3:
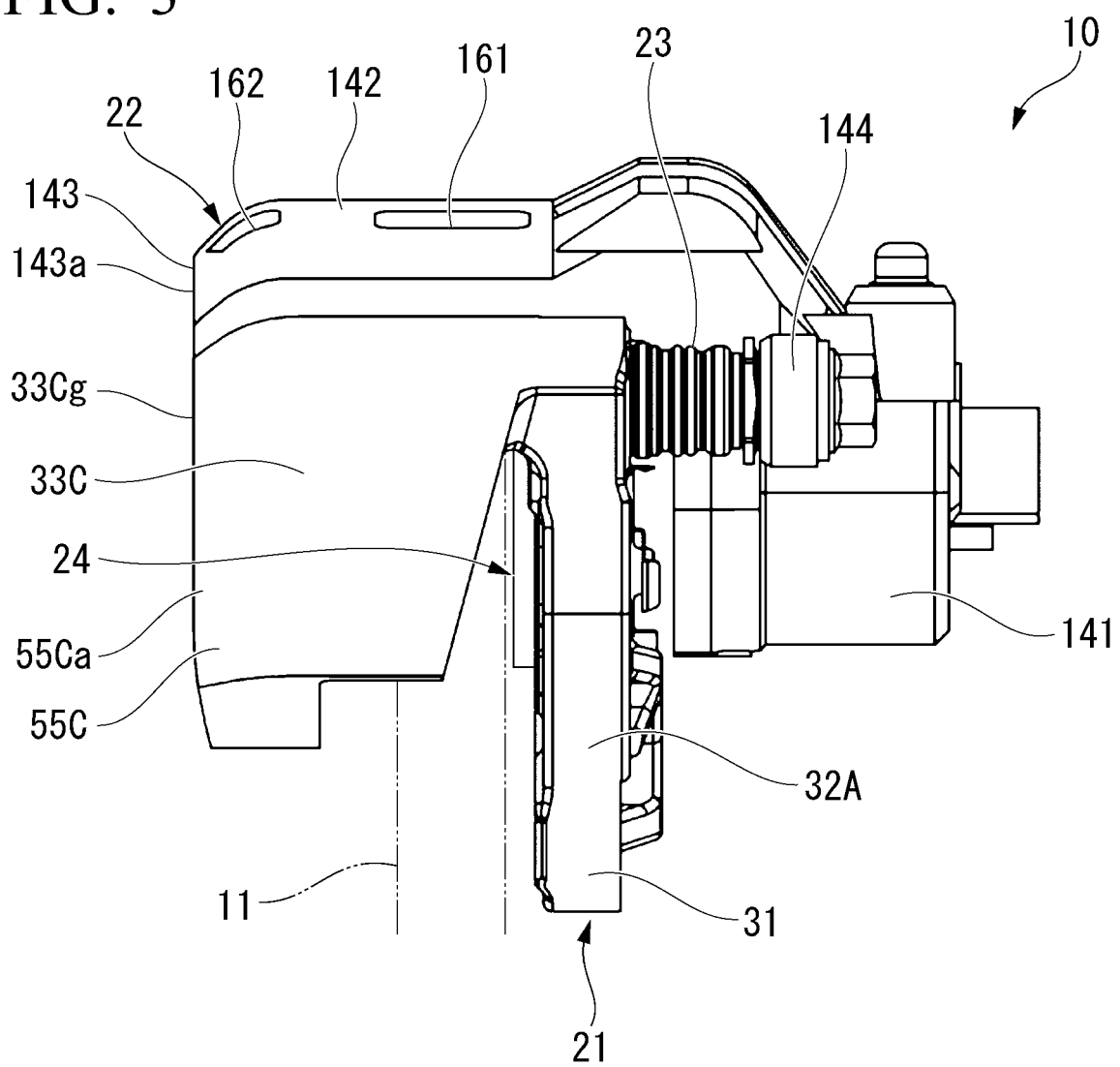
FIG. 3 is a side view illustrating the disk brake according to the embodiment of the present invention.
Figure 4:
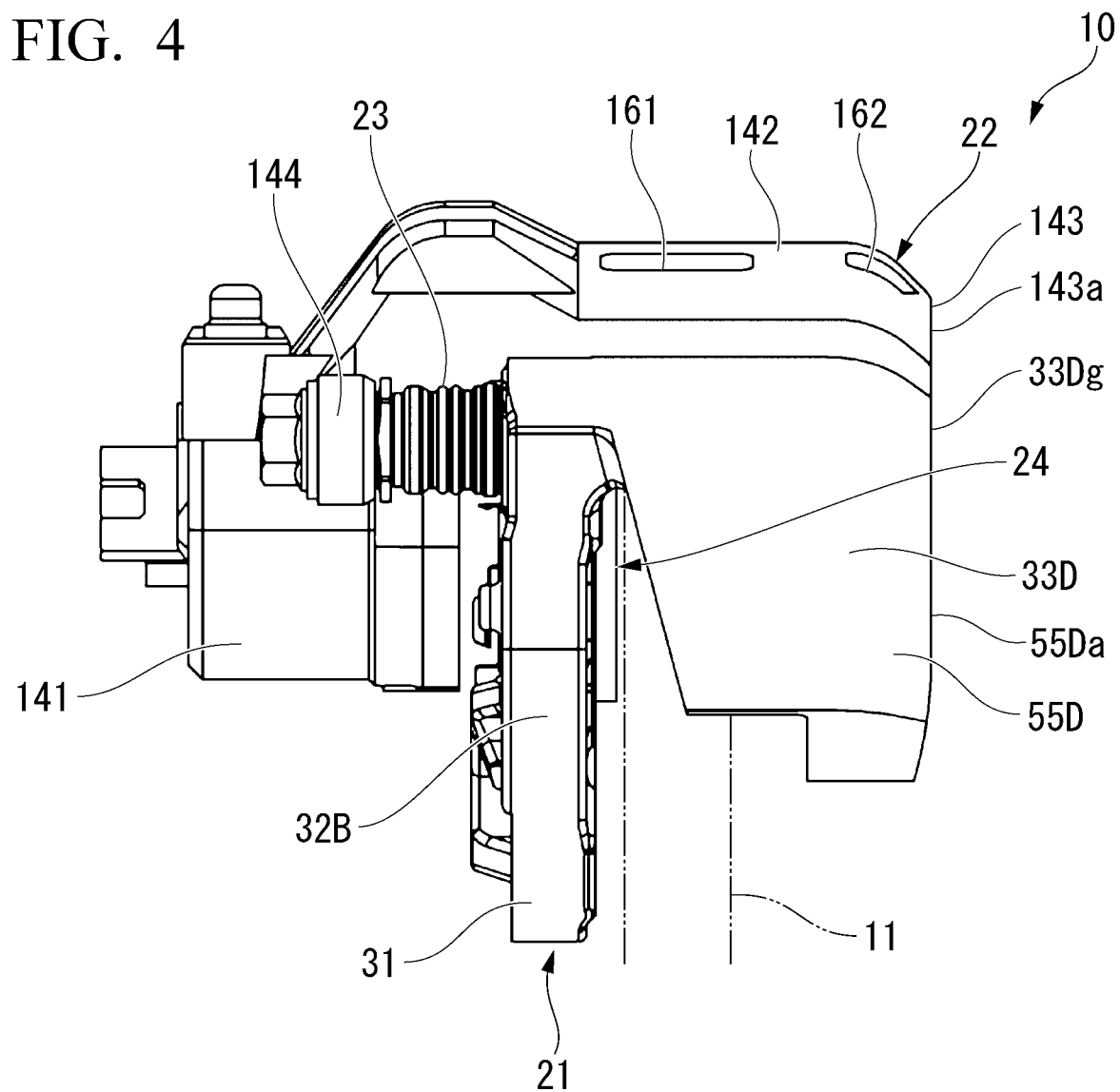
FIG. 4 is another side view illustrating the disk brake according to the embodiment of the present invention.

The attachment member 21 has a fixing portion 31 illustrated in FIG. 1, a pair of inner side pad support portions 32A and 32B (support portions) illustrated in FIGS. 3 and 4, and a pair of outer circumferential frame portions 33C and 33D illustrated in FIGS. 1 to 7. The attachment member 21 has a pair of outer side pad support portions 36C and 36D (support portions) illustrated in FIGS. 1 and 7, and a coupling beam portion 37. The attachment member 21 has a mirror-symmetrical shape with respect to the center in the disk circumferential direction.

As illustrated in FIGS. 3 and 4, the fixing portion 31 is disposed on one side in the disk axial direction with respect to the disk 11 and is fixed to a non-rotation part (not illustrated) of the vehicle. The non-rotation part of the vehicle having the attachment member 21 attached thereto is disposed on the disk-axially inward side with respect to the disk 11. The fixing portion 31 attached to this non-rotation part is also disposed on the disk-axially inward side with respect to the disk 11. As illustrated in FIG. 1, the fixing portion 31 is disposed so as to extend in the disk circumferential direction.

Figure 8:
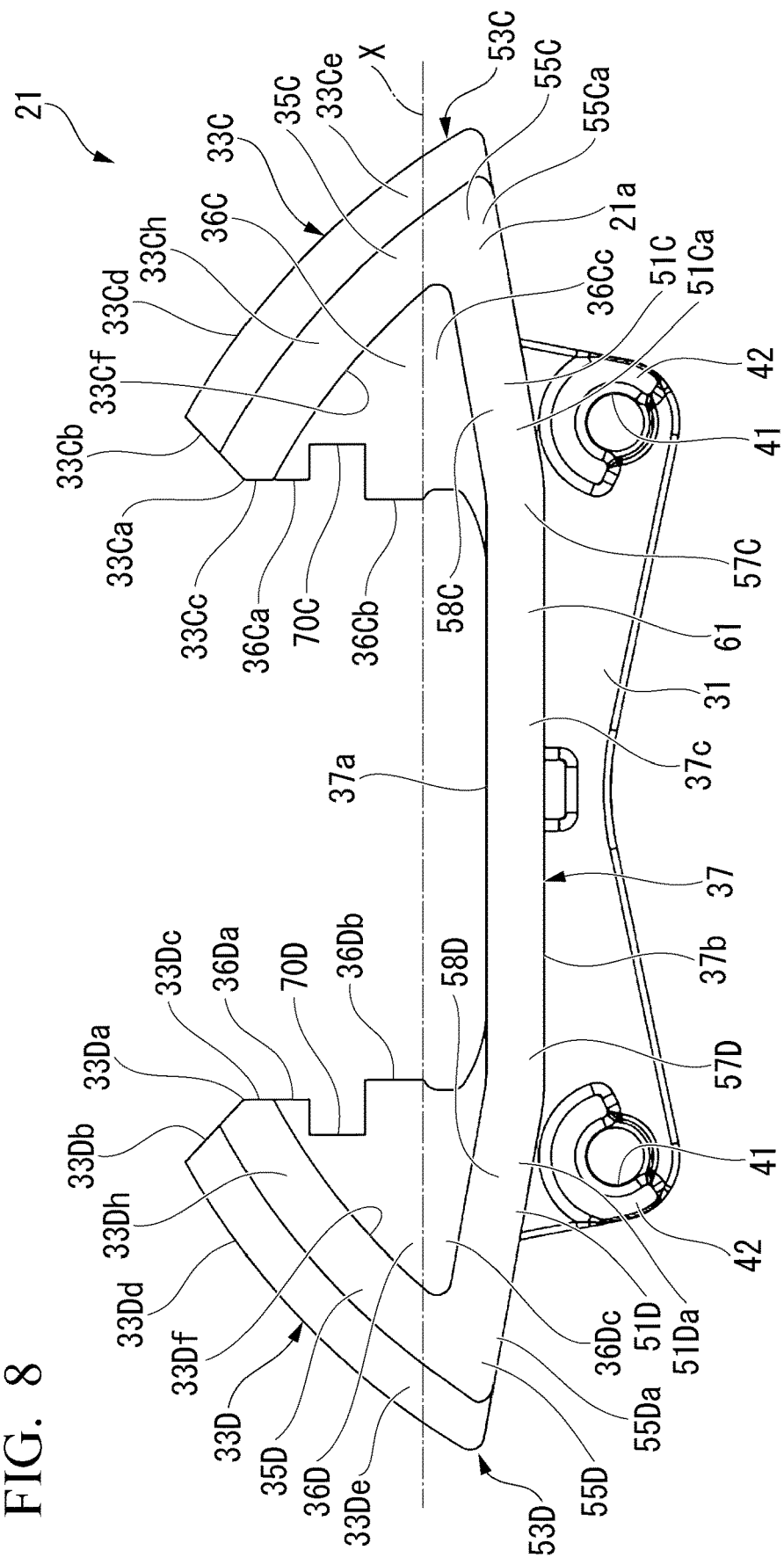
FIG. 8 is a front view illustrating an attachment member of the disk brake according to the embodiment of the present invention.
Figure 9:
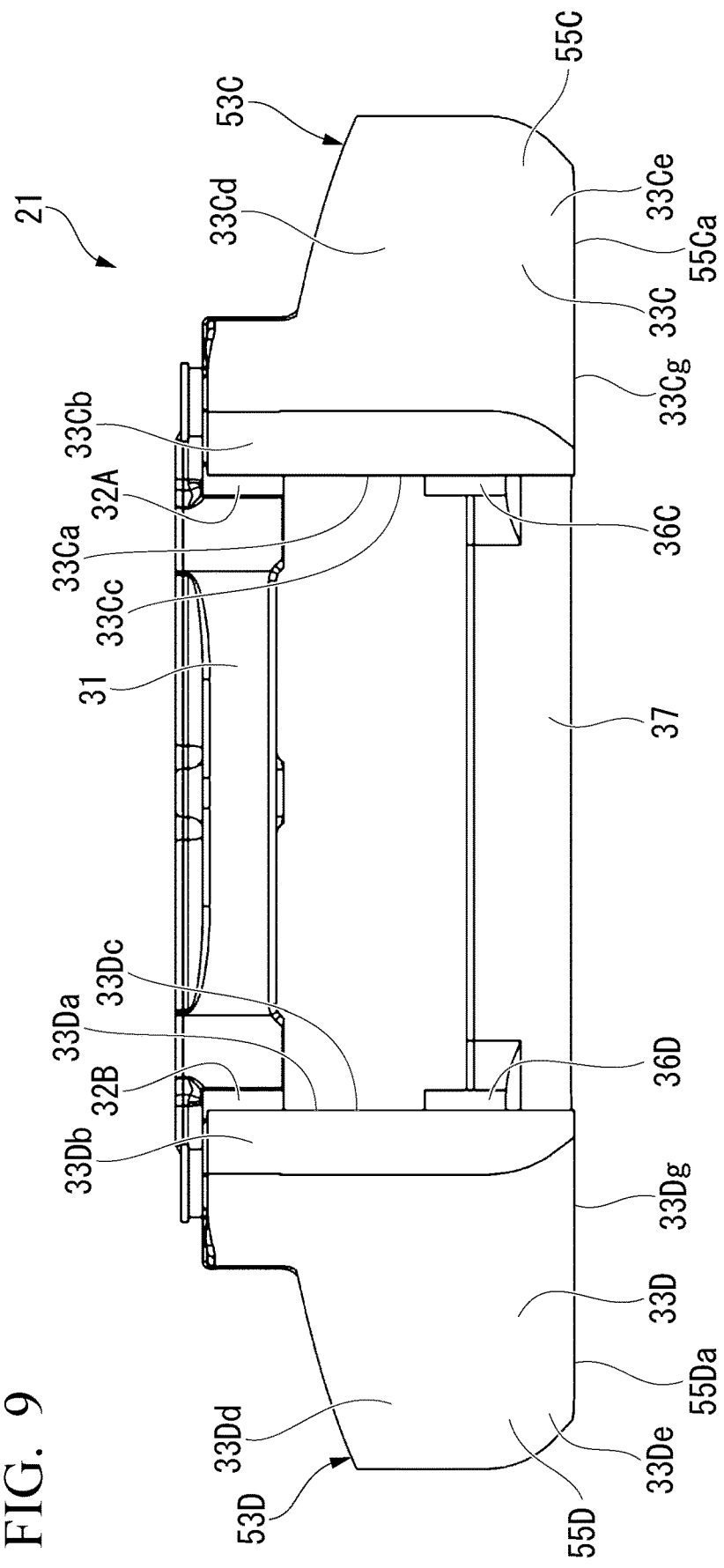
FIG. 9 is a plan view illustrating the attachment member of the disk brake according to the embodiment of the present invention.
Figure 10:
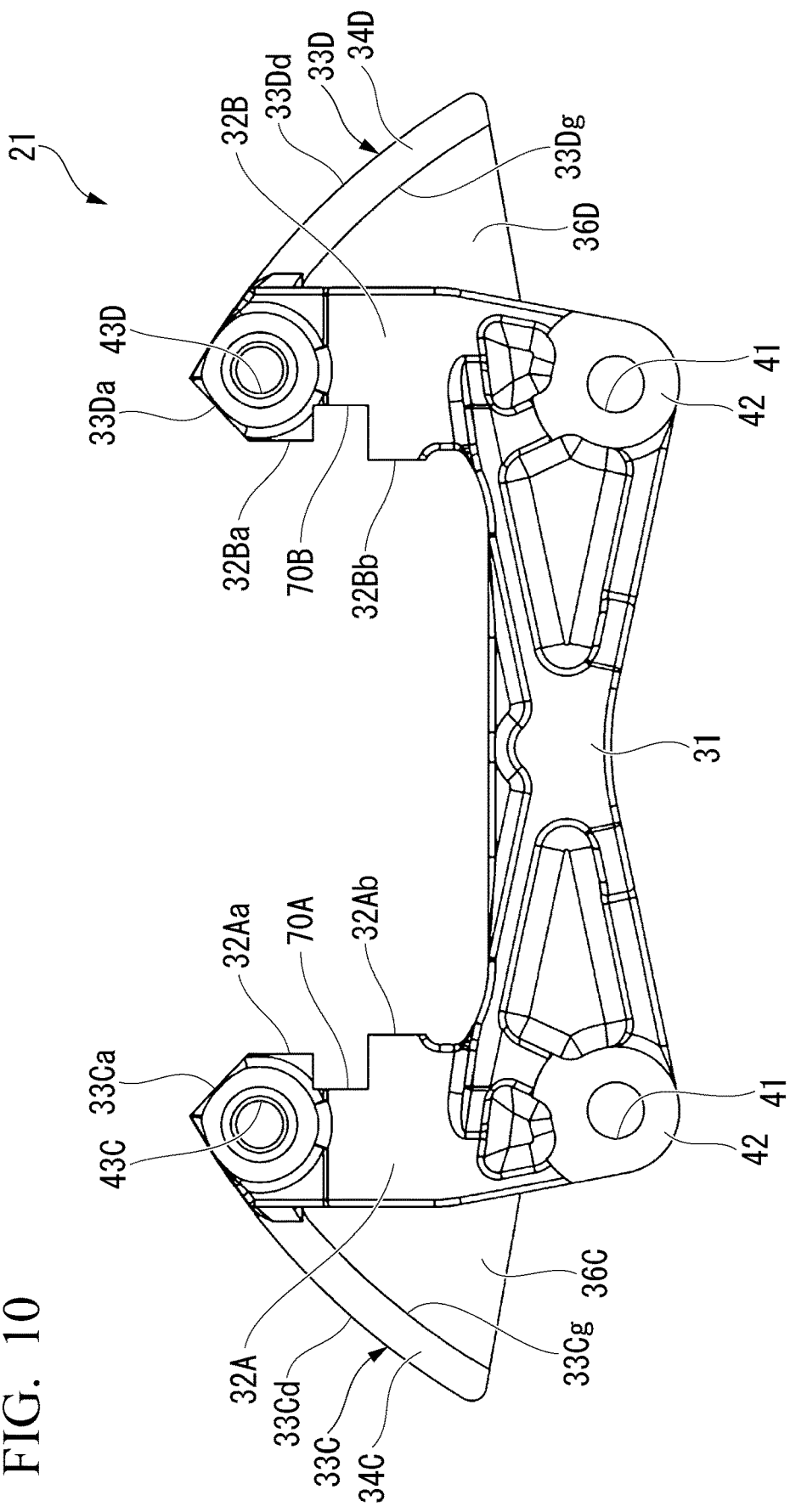
FIG. 10 is a rear view illustrating the attachment member of the disk brake according to the embodiment of the present invention.

The attachment member 21 has a shape as illustrated in FIGS. 8 to 13. As illustrated in FIGS. 8 and 10, in the fixing portion 31, a pair of attachment boss portions 42 are provided at both end portions in the disk circumferential direction. The pair of attachment boss portions 42 respectively have attachment holes 41. The fixing portion 31 is attached to the non-rotation part of the vehicle by the pair of attachment boss portions 42.

The pair of inner side pad support portions 32A and 32B include the inner side pad support portion 32A on the disk entry side and the inner side pad support portion 32B on the disk exit side. As illustrated in FIG. 10, the inner side pad support portion 32A extends in the disk-radially outward side from an end portion of the fixing portion 31 on the disk entry side. The inner side pad support portion 32B extends from an end portion of the fixing portion 31 on the disk exit side to the outward side in the disk radial direction. As illustrated in FIGS. 3 and 4, as in the same manner with the fixing portion 31, the pair of inner side pad support portions 32A and 32B are disposed on the disk-axially inward side with respect to the disk 11.

Figure 11:
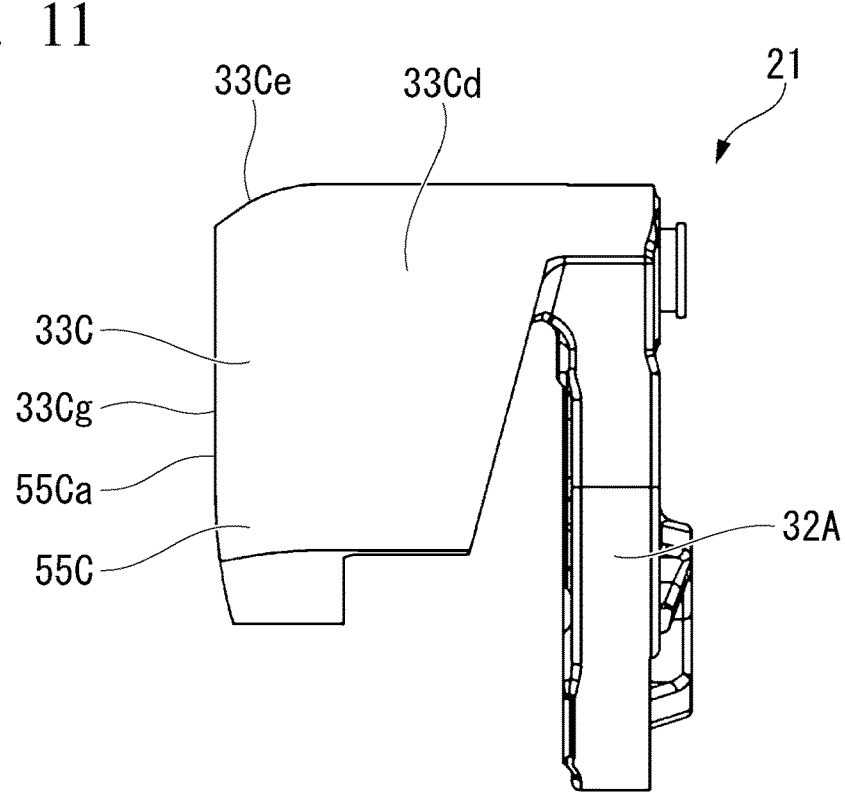
FIG. 11 is a side view illustrating the attachment member of the disk brake according to the embodiment of the present invention.
Figure 12:
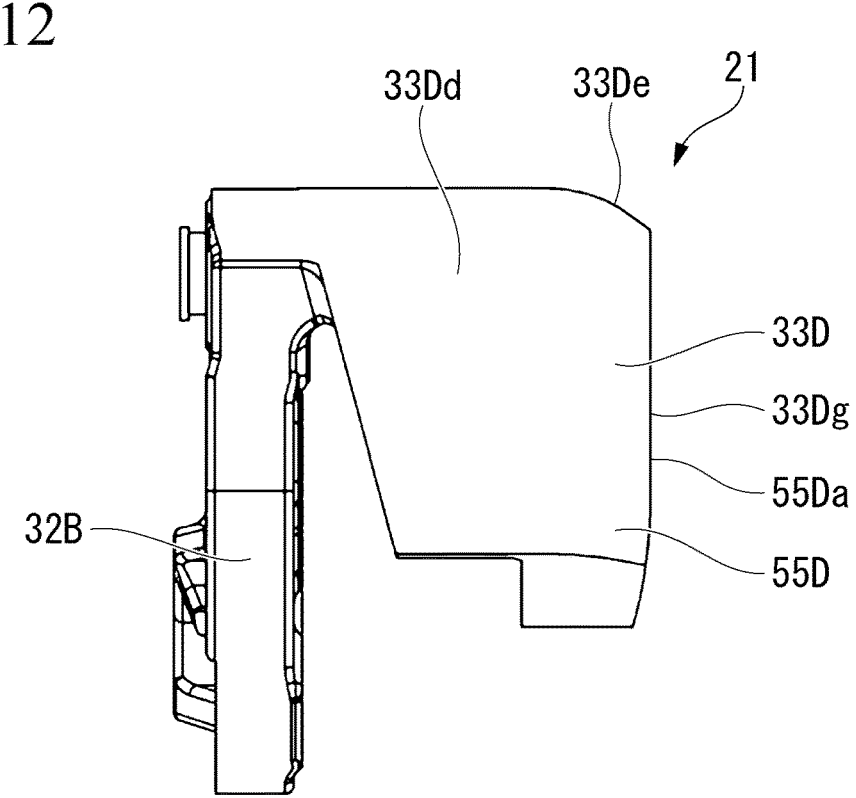
FIG. 12 is another side view illustrating the attachment member of the disk brake according to the embodiment of the present invention.

The pair of outer circumferential frame portions 33C and 33D include the outer circumferential frame portion 33C on the disk entry side and the outer circumferential frame portion 33D on the disk exit side. As illustrated in FIG. 11, the outer circumferential frame portion 33C extends from an end portion of the inner side pad support portion 32A on the outward side in the disk radial direction to the disk-axially outward side in the disk axial direction. As illustrated in FIG. 12, the outer circumferential frame portion 33D extends from an end portion of the inner side pad support portion 32B on the outward side in the disk radial direction to the disk-axially outward side in the disk axial direction.

As illustrated in FIG. 3, the outer circumferential frame portion 33C on the disk entry side straddles an outer circumferential side of the disk 11 in the disk axial direction when extending from the end portion of the inner side pad support portion 32A on the outward side in the disk radial direction to the disk-axially outward side. This outer circumferential frame portion 33C extends in a direction opposite to the outer circumferential frame portion 33D on the disk exit side in the disk circumferential direction from the end portion of the inner side pad support portion 32A on the outward side in the disk radial direction so as to cover the disk 11 on the disk-radially outward side as illustrated in FIG. 2.

As illustrated in FIG. 4, the outer circumferential frame portion 33D also straddles the outer circumferential side of the disk 11 in the disk axial direction when extending from the end portion of the inner side pad support portion 32B on the outward side in the disk radial direction to the disk-axially outward side. The outer circumferential frame portion 33D extends in a direction opposite to the outer circumferential frame portion 33C on the disk entry side in the disk circumferential direction from the end portion of the inner side pad support portion 32B on the outward side in the disk radial direction so as to cover the disk 11 on the disk-radially outward side as illustrated in FIG. 2.

In other words, as illustrated in FIG. 10, the pair of outer circumferential frame portions 33C and 33D spread in directions in which they separate further from each other in the disk circumferential direction from end portions of the pair of inner side pad support portions 32A and 32B on the outward side in the disk radial direction. Both the pair of outer circumferential frame portions 33C and 33D are curved in arc shapes along an outer circumferential surface of the disk 11.

As illustrated in FIG. 8, in the pair of outer circumferential frame portions 33C and 33D, facing surfaces 33Ca and 33Da which face each other are respectively formed on sides closer to each other in the disk circumferential direction. The facing surface 33Ca formed in the outer circumferential frame portion 33C on the disk entry side is configured of an outward side facing surface portion 33Cb on the disk-radially outward side and an inward side facing surface portion 33Cc on the disk-radially inward side. The facing surface 33Da formed in the outer circumferential frame portion 33D on the disk exit side is configured of an outward side facing surface portion 33Db on the disk-radially outward side and an inward side facing surface portion 33Dc on the disk-radially inward side. All of the outward side facing surface portions 33Cb and 33Db and the inward side facing surface portions 33Cc and 33Dc spread in the disk axial direction. In the facing surfaces 33Ca and 33Da, the inward side facing surface portions 33Cc and 33Dc are parallel to each other. In the facing surfaces 33Ca and 33Da, the outward side facing surface portions 33Cb and 33Db incline with respect to the facing surfaces 33Ca and 33Da such that they separate further from each other in the disk circumferential direction toward the disk-radially outward sides.

In the pair of outer circumferential frame portions 33C and 33D, outer circumferential end surfaces 33Cd and 33Dd facing the disk-radially outward sides are respectively formed at the end portions on the disk-radially outward sides. The outer circumferential end surface 33Cd formed in the outer circumferential frame portion 33C and the outer circumferential end surface 33Dd formed in the outer circumferential frame portion 33D are disposed on the same cylindrical surface. A pair of outer circumferential end surfaces 33Cd and 33Dd are provided on disk-radially outermost sides in the attachment member 21.

Chamfers 33Ce and 33De adjacent to the disk-axially outward sides of the outer circumferential end surfaces 33Cd and 33Dd are respectively formed in the pair of outer circumferential frame portions 33C and 33D. That is, the chamfer 33Ce adjacent to the disk-axially outward side of the outer circumferential end surface 33Cd is formed in the one outer circumferential frame portion 33C on the disk entry side. The chamfer 33De adjacent to the disk-axially outward side of the outer circumferential end surface 33Dd is formed in the other outer circumferential frame portion 33D on the disk exit side. The chamfer 33Ce formed in the outer circumferential frame portion 33C and the chamfer 33De formed in the outer circumferential frame portion 33D face the disk-radially outward sides and the disk-axially outward sides. The chamfers 33Ce and 33De have tapered shapes such that they are positioned on the disk-radially inward sides toward the disk-axially outward sides. The chamfer 33Ce and the chamfer 33De are disposed on the same tapered surface.

In the pair of outer circumferential frame portions 33C and 33D, inner circumferential end surfaces 33Cf and 33Df facing the disk-radially inward sides are respectively formed on the disk-axially outward sides from the outer side pad support portions 36C and 36D. The inner circumferential end surface 33Cf formed in the one outer circumferential frame portion 33C and the inner circumferential end surface 33Df formed in the other outer circumferential frame portion 33D are disposed on the same cylindrical surface.

As illustrated in FIG. 10, in the pair of outer circumferential frame portions 33C and 33D, inner circumferential surfaces 33Cg and 33Dg facing the disk-radially inward sides are formed between the outer side pad support portions 36C and 36D and the inner side pad support portions 32A and 32B, respectively. The inner circumferential surface 33Cg formed in the one outer circumferential frame portion 33C and the inner circumferential surface 33Dg formed in the other outer circumferential frame portion 33D are disposed on the same cylindrical surface. This cylindrical surface has a larger diameter than the cylindrical surface on which the inner circumferential end surfaces 33Cf and 33Df illustrated in FIG. 8 are disposed. In the pair of outer circumferential frame portions 33C and 33D, these inner circumferential surfaces 33Cg and 33Dg illustrated in FIG. 10 positionally overlap the disk 11 in the disk axial direction and face the disk 11 in the disk radial direction.

A range of the outer circumferential frame portion 33C positionally overlapping the inner circumferential surface 33Cg in the disk axial direction becomes a disk path portion 34C straddling the disk 11. A part of the outer circumferential frame portion 33C on the disk-axially outward side of the disk path portion 34C becomes an outward side constituting portion 35C illustrated in FIG. 13. A range of the outer circumferential frame portion 33D positionally overlapping the inner circumferential surface 33Dg in the disk axial direction becomes a disk path portion 34D straddling the disk 11. A part of the outer circumferential frame portion 33D on the disk-axially outward side of the disk path portion 34D becomes an outward side constituting portion 35D.

In the pair of outer circumferential frame portions 33C and 33D, outward side end surfaces 33Ch and 33Dh facing the disk-axially outward sides are formed at the respective end portions on the disk-axially outward sides. The outward side end surface 33Ch formed in the one outer circumferential frame portion 33C and the outward side end surface 33Dh formed in the other outer circumferential frame portion 33D are disposed in the same plane. This plane is a plane spreading in a manner of being orthogonal to the disk axial direction.

As illustrated in FIG. 10, a pair of pin insertion holes 43C and 43D are formed in the attachment member 21. The pin insertion holes 43C and 43D extend in the disk axial direction at parts of the pair of outer circumferential frame portions 33C and 33D on sides closer to each other in the disk circumferential direction. The one pin insertion hole 43C is formed from the end portion of the outer circumferential frame portion 33C on the disk-axially inward side to a middle position in the disk axial direction. The other pin insertion hole 43D is formed from the end portion of the outer circumferential frame portion 33D on the disk-axially inward side to the middle position in the disk axial direction.

Figure 5:
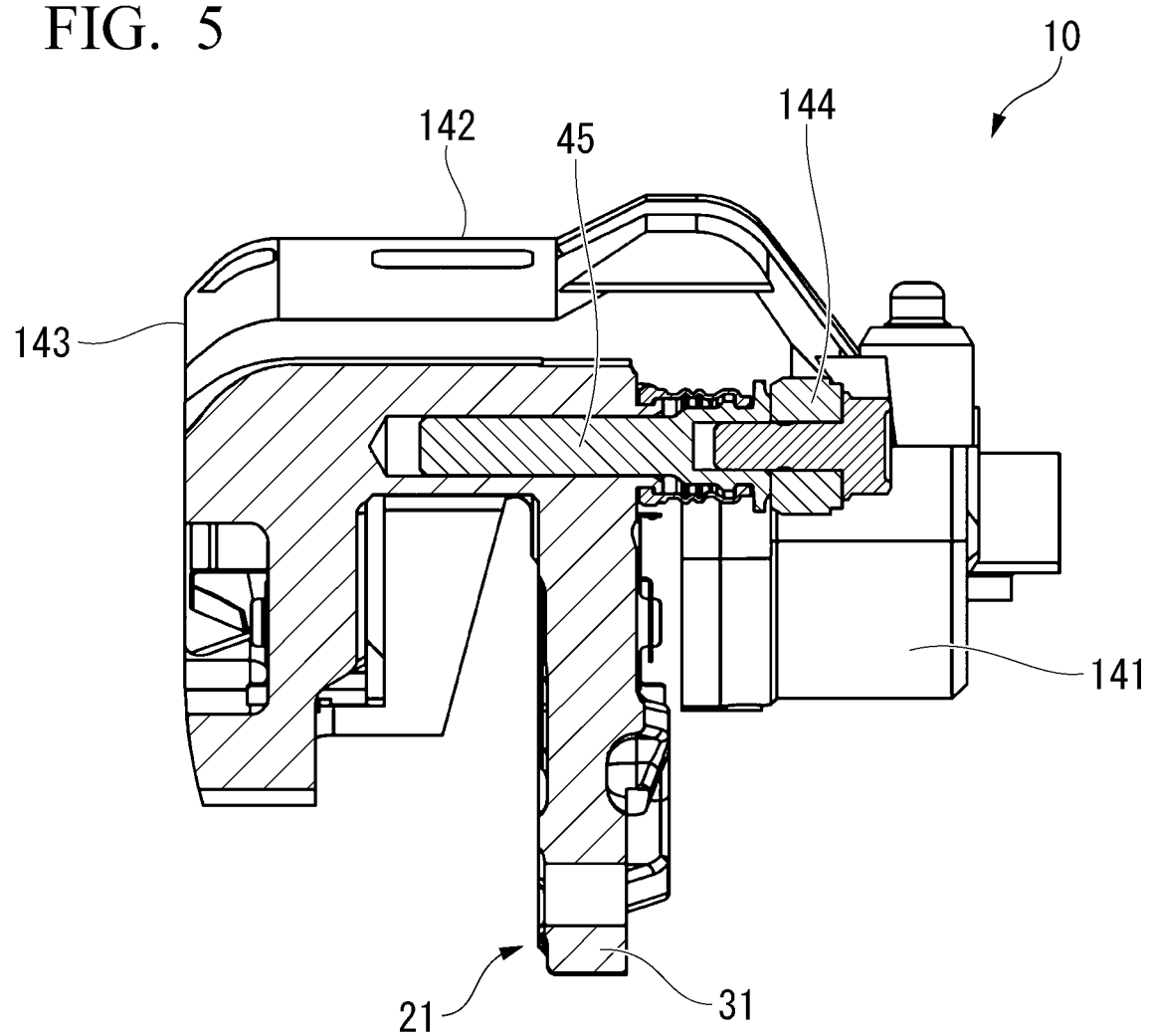
FIG. 5 is a lateral cross-sectional view illustrating the disk brake according to the embodiment of the present invention.
Figure 6:
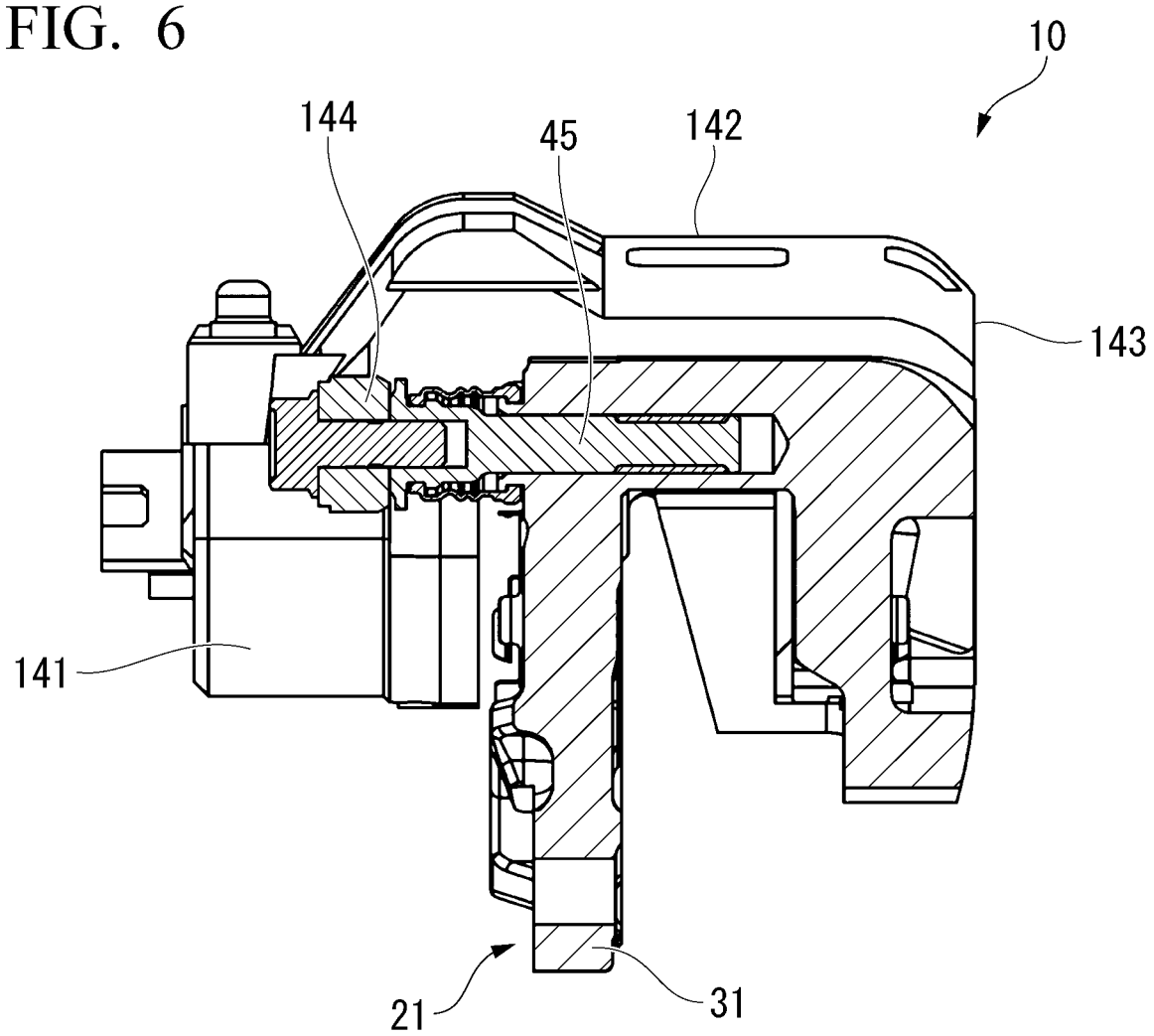
FIG. 6 is another lateral cross-sectional view illustrating the disk brake according to the embodiment of the present invention.

In the attachment member 21, a pair of slide pins 45 on both sides of the caliper 22 illustrated in FIGS. 5 and 6 in the disk circumferential direction are slidably fitted into the pair of pin insertion holes 43C and 43D. Accordingly, the pair of outer circumferential frame portions 33C and 33D of the attachment member 21 support the caliper 22 so as to be able to slide in the disk axial direction. In other words, in the caliper 22, the pair of slide pins 45 provided on both sides in the disk circumferential direction are slidably fitted into the corresponding pin insertion holes 43C and 43D of the attachment member 21, respectively. Accordingly, the caliper 22 is supported by the attachment member 21 so as to be able to move in the disk axial direction.

Both the pair of outer side pad support portions 36C and 36D illustrated in FIGS. 8 and 10 have flat plate shapes spreading in a manner of being orthogonal to the disk axial direction. The pair of outer side pad support portions 36C and 36D include the outer side pad support portion 36C on the disk entry side and the outer side pad support portion 36D on the disk exit side. The outer side pad support portion 36C extends to the inward side in the disk radial direction from an intermediate portion on the disk-axially outward side from the inner side pad support portion 32A illustrated in FIG. 10 of the outer circumferential frame portion 33C. The outer side pad support portion 36D extends to the inward side in the disk radial direction from the intermediate portion on the disk-axially outward side from the inner side pad support portion 32B of the outer circumferential frame portion 33D. The pair of outer side pad support portions 36C and 36D are disposed on the disk-axially outward side with respect to the disk 11.

Figure 13:
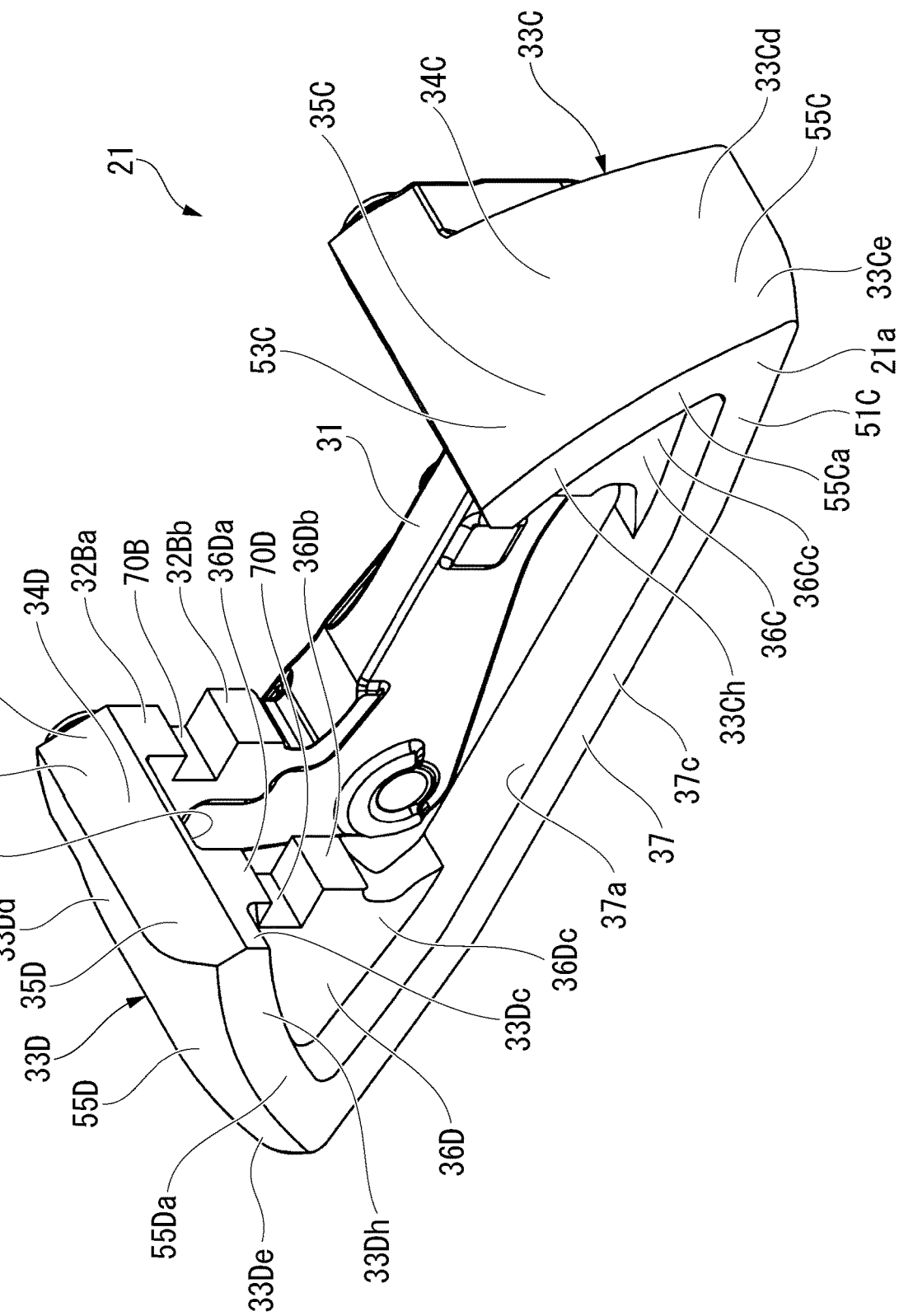
FIG. 13 is a perspective view illustrating the attachment member of the disk brake according to the embodiment of the present invention.

As illustrated in FIG. 13, the pair of outer side pad support portions 36C and 36D are positioned on the disk-axially inward sides respectively from the outward side end surfaces 33Ch and 33Dh of the pair of outer circumferential frame portions 33C and 33D. In other words, the pair of outer circumferential frame portions 33C and 33D protrude to the disk-axially outward side beyond outward side end surfaces 36Cc and 36Dc at the respective end portions of the pair of outer side pad support portions 36C and 36D on the disk-axially outward sides. The outward side end surface 36Cc of the one outer side pad support portion 36C and the outward side end surface 36Dc of the other outer side pad support portion 36D are disposed in the same plane toward the disk-axially outward sides. This plane is parallel to a plane in which the outward side end surfaces 33Ch and 33Dh of the pair of outer circumferential frame portions 33C and 33D are disposed.

The coupling beam portion 37 extends in the disk circumferential direction and the disk radial direction and couples the disk-radially inward sides of the pair of outer side pad support portions 36C and 36D to each other. In addition, in the coupling beam portion 37, both end portions in the disk circumferential direction extend in the disk circumferential direction and are coupled to the pair of outer circumferential frame portions 33C and 33D. In the same manner with the pair of outer side pad support portions 36C and 36D, the coupling beam portion 37 is disposed on the disk-axially outward side with respect to the disk 11.

In the coupling beam portion 37, an outward end surface 37*a* facing the disk-radially outward side is formed at the end portion on the disk-radially outward side. As illustrated in FIG. 8, an inward end surface 37*b* facing the disk-radially inward side is formed at the end portion on the disk-radially inward side. In the coupling beam portion 37, an outward side end surface 37*c* facing the disk-axially outward side is formed at the end portion on the disk-axially outward side.

As illustrated in FIG. 13, the coupling beam portion 37 in its entirety protrudes to the disk-axially outward sides respectively beyond the outward side end surfaces 36Cc and 36Dc of the pair of outer side pad support portions 36C and 36D. In other words, the pair of outer side pad support portions 36C and 36D are positioned on the disk-axially inward sides from the outward side end surface 37*c* at the end portion of the coupling beam portion 37 on the disk-axially outward side. The outward side end surface 37*c* of the coupling beam portion 37 and the outward side end surfaces 33Ch and 33Dh of the pair of outer circumferential frame portions 33C and 33D configure an outward side end surface 21*a* at the end portion in the attachment member 21 on the disk-axially outward side.

The coupling beam portion 37 extends in the disk radial direction and the disk circumferential direction, and the end portion in the disk circumferential direction is coupled to the pair of outer circumferential frame portions 33C and 33D. The coupling beam portion 37 is adjacently connected to the one outer circumferential frame portion 33C on the disk entry side so as to form an acute angle shape and is also adjacently connected to the other outer circumferential frame portion 33D on the disk exit side so as to form an acute angle shape. In other words, each of the pair of outer circumferential frame portions 33C and 33D is connected to the coupling beam portion 37 so as to form an acute angle shape.

The outer side pad support portion 36C, the outward side constituting portion 35C of the outer circumferential frame portion 33C on the disk-axially outward side adjacently connected thereto, and a part constituting portion 51C on the disk entry side of the coupling beam portion 37 adjacently connected to the outer side pad support portion 36C configure a support main body portion 53C on the disk entry side. This support main body portion 53C is provided on the disk-axially outward side of the attachment member 21 from the disk 11 and has the outward side constituting portion 35C adjacently connected thereto and the part constituting portion 51C as parts of an outer frame thereof.

In this support main body portion 53C, the outer side pad support portion 36C is formed between the outward side constituting portion 35C of the outer circumferential frame portion 33C adjacently connected thereto and the part constituting portion 51C of the coupling beam portion 37. The outward side constituting portion 35C adjacently connected thereto and the part constituting portion 51C become an outer frame constituting portion 55C configuring the outer frame of the support main body portion 53C. In the coupling beam portion 37, the part constituting portion 51C configuring the outer frame constituting portion 55C positionally overlaps the outer side pad support portion 36C in the disk circumferential direction.

As illustrated in FIG. 8, a disk-circumferentially inward side of the part constituting portion 51C (a central side of the attachment member 21 in the disk circumferential direction) becomes an inward side extending portion 57C. A disk-circumferentially outward side of the part constituting portion 51C (a side opposite to the center of the attachment member 21 in the disk circumferential direction) becomes an outward side extending portion 58C. Here, a line passing the central position of the attachment member 21 in the disk circumferential direction and extending in the disk radial direction will be referred to as a reference line in the disk radial direction. Consequently, in the part constituting portion 51C, the inward side extending portion 57C thereof has a linear shape and extends in a manner of being orthogonal to the reference line in the disk radial direction. The outward side extending portion 58C of the part constituting portion 51C has a linear shape, inclines with respect to the inward side extending portion 57C, and is adjacently connected thereto.

An outward side end surface 51Ca at the end portion of the one part constituting portion 51C on the disk-axially outward side included on the outward side end surface 37*c* of the coupling beam portion 37 is also disposed in the same plane as the outward side end surface 33Ch at the end portion of the outer circumferential frame portion 33C on the disk-axially outward side configuring the same outer frame constituting portion 55C. An outward side end surface 55Ca (a disk-axially outward side end surface) at the end portion of the one outer frame constituting portion 55C on the disk-axially outward side is configured of the outward side end surface 33Ch of the one outer circumferential frame portion 33C and the outward side end surface 51Ca of the part constituting portion 51C adjacently connected thereto. The outward side end surface 55Ca is included on the outward side end surface 37*c* of the coupling beam portion 37.

The outer side pad support portion 36D, the outward side constituting portion 35D of the outer circumferential frame portion 33D on the disk-axially outward side adjacently connected thereto, and a part constituting portion 51D on the disk exit side of the coupling beam portion 37 adjacently connected to the outer side pad support portion 36D configure a support main body portion 53D on the disk exit side. This support main body portion 53D is provided on the disk-axially outward side of the attachment member 21 from the disk 11 and has the outward side constituting portion 35D adjacently connected thereto and the part constituting portion 51D as parts of an outer frame thereof.

In this support main body portion 53D, the outer side pad support portion 36D is formed between the outward side constituting portion 35D of the outer circumferential frame portion 33D adjacently connected thereto and the part constituting portion 51D of the coupling beam portion 37. The outward side constituting portion 35D adjacently connected thereto and the part constituting portion 51D become an outer frame constituting portion 55D configuring the outer frame of the support main body portion 53D. In the coupling beam portion 37, the part constituting portion 51D configuring the outer frame constituting portion 55D positionally overlaps the outer side pad support portion 36D in the disk circumferential direction.

The disk-circumferentially inward side of the part constituting portion 51D becomes an inward side extending portion 57D. A disk-circumferentially outward side of the part constituting portion 51D becomes an outward side extending portion 58D. The inward side extending portion 57D of the part constituting portion 51D has a linear shape and extends in a manner of being orthogonal to the reference line in the disk radial direction. The outward side extending portion 58D of the part constituting portion 51D has a linear shape, inclines with respect to the inward side extending portion 57D, and is adjacently connected thereto.

An outward side end surface 51Da at the end portion of the other part constituting portion 51D on the disk-axially outward side included on the outward side end surface 37c of the coupling beam portion 37 is also disposed in the same plane as the outward side end surface 33Dh at the end portion of the outer circumferential frame portion 33D on the disk-axially outward side constituting the same outer frame constituting portion 55D. An outward side end surface 55Da (a disk-axially outward side end surface) at the end portion of the other outer frame constituting portion 55D on the disk-axially outward side is configured of the outward side end surface 33Dh of the other outer circumferential frame portion 33D and the outward side end surface 51Da of the part constituting portion 51D adjacently connected thereto. The outward side end surface 55Da is included on the outward side end surface 37c of the coupling beam portion 37.

The coupling beam portion 37 is configured of the part constituting portion 51C on the disk entry side, the part constituting portion 51D on the disk exit side, and an intermediate constituting portion 61 provided therebetween. The intermediate constituting portion 61 has a linear shape and extends in a manner of being orthogonal to the reference line in the disk radial direction. The intermediate constituting portion 61 is continuously formed in the same straight line as the inward side extending portions 57C and 57D of the part constituting portions 51C and 51D on both sides in the disk circumferential direction. The intermediate constituting portion 61 positionally overlaps none of the pair of outer side pad support portions 36C and 36D in the disk circumferential direction.

The attachment member 21 is disposed so as to straddle the outer circumferential side of the disk 11 and is attached to the non-rotation part of the vehicle. The fixing portion 31 and the pair of inner side pad support portions 32A and 32B are disposed on the disk-axially inward sides which become attachment sides to the non-rotation part of the vehicle in the attachment member 21. The pair of outer side pad support portions 36C and 36D and the coupling beam portion 37 are disposed on the disk-axially outward sides in the attachment member 21.

As illustrated in FIG. 10, a pair of recessed support main body portions 70A and 70B are formed in the pair of inner side pad support portions 32A and 32B. As illustrated in FIG. 8, a pair of recessed support main body portions 70C and 70D are formed in the pair of outer side pad support portions 36C and 36D. The support main body portions 70A, 70B, 70C, and 70D have similar shapes.

As illustrated in FIG. 10, the support main body portion 70A is formed in the inner side pad support portion 32A on the disk entry side. The support main body portion 70A is provided on the disk-circumferentially inward side of the inner side pad support portion 32A. The support main body portion 70A has a shape recessed from a surface 32Aa on the disk-radially outward side and a surface 32Ab on the disk-radially inward side toward the disk-circumferentially outward side. The surface 32Aa of the inner side pad support portion 32A on the disk-radially outward side is disposed on the disk-circumferentially outward side from the surface 32Ab on the disk-radially inward side.

The support main body portion 70B is also formed in the inner side pad support portion 32B on the disk exit side. The support main body portion 70B is formed on the disk-circumferentially inward side of the inner side pad support portion 32B. The support main body portion 70B has a shape recessed from a surface 32Ba on the disk-radially outward side and a surface 32Bb on the disk-radially inward side toward the disk-circumferentially outward side. The surface 32Ba of the inner side pad support portion 32B on the disk-radially outward side is disposed on the disk-circumferentially outward side from the surface 32Bb on the disk-radially inward side.

The pair of inner side pad support portions 32A and 32B are disposed parallel to each other with the surfaces 32Aa and 32Ba thereof positionally aligned in the disk axial direction and the disk radial direction. The pair of inner side pad support portions 32A and 32B are disposed parallel to each other with 32Ab and 32Bb thereof positionally aligned in the disk axial direction and the disk radial direction. In the pair of inner side pad support portions 32A and 32B, the support main body portions 70A and 70B thereof are positionally aligned in the disk axial direction and the disk radial direction.

Thus, in the pair of inner side pad support portions 32A and 32B, the recessed support main body portions 70A and 70B recessed in a direction in which they separate further from each other in the disk circumferential direction are formed on sides facing each other. The one brake pad 24 of the pair of brake pads 24 and 25 is supported by the pair of support main body portions 70A and 70B provided in the pair of inner side pad support portions 32A and 32B.

As illustrated in FIG. 8, the support main body portion 70C is formed in the outer side pad support portion 36C. The support main body portion 70C is formed on the disk-circumferentially inward side of the outer side pad support portion 36C. The support main body portion 70C has a shape recessed from a surface 36Ca on the disk-radially outward side and a surface 36Cb on the disk-radially inward side toward the disk-circumferentially outward side. The surface 36Ca of the outer side pad support portion 36C on the disk-radially outward side is disposed on the disk-circumferentially outward side from the surface 36Cb on the disk-radially inward side. The surface 36Ca is continuously disposed in the same plane as the inward side facing surface portion 33Cc of the outer circumferential frame portion 33C adjacent to the outer side pad support portion 36C.

The support main body portion 70D is also formed in the outer side pad support portion 36D. The support main body portion 70D is formed on the disk-circumferentially inward side of the outer side pad support portion 36D. The support main body portion 70D has a shape recessed from a surface 36Da on the disk-radially outward side and a surface 36Db on the disk-radially inward side toward the disk-circumferentially outward side. The surface 36Da of this outer side pad support portion 36D on the disk-radially outward side is disposed on the disk-circumferentially outward side from the surface 36Db on the disk-radially inward side. The surface 36Da is continuously disposed in the same plane as the inward side facing surface portion 33Dc of the outer circumferential frame portion 33D adjacent to the outer side pad support portion 36D.

The pair of outer side pad support portions 36C and 36D are disposed parallel to each other with the surfaces 36Ca and 36Da thereof positionally aligned in the disk axial direction and the disk radial direction. The pair of outer side pad support portions 36C and 36D are disposed parallel to each other with the surfaces 36Cb and 36Db thereof positionally aligned in the disk axial direction and the disk radial direction. In the pair of outer side pad support portions 36C and 36D, the support main body portions 70C and 70D thereof are positionally aligned in the disk axial direction and the disk radial direction.

Thus, in the pair of outer side pad support portions 36C and 36D, the recessed support main body portions 70C and 70D recessed in a direction in which they separate further from each other in the disk circumferential direction are formed on sides facing each other. The other brake pad 25 of the pair of brake pads 24 and 25 is supported by the pair of support main body portions 70C and 70D provided in the pair of outer side pad support portions 36C and 36D.

In the pair of outer circumferential frame portions 33C and 33D, the respective end portions on the disk-radially inward sides are positioned on the disk-radially inward sides from the end portions of the surfaces 36Cb and 36Db of the pair of outer side pad support portions 36C and 36D on the disk-radially inward sides in the extending direction of the reference line in the disk radial direction. In other words, in the pair of outer circumferential frame portions 33C and 33D, positions of the end portions of the outer circumferential end surfaces 33Cd and 33Dd on the side closer to the coupling beam portion 37 and positions of the end portions of the inner circumferential end surfaces 33Cf and 33Df on the side closer to the coupling beam portion 37 are positions on the coupling beam portion 37 side from positions of the end portions of the surfaces 36Cb and 36Db on the coupling beam portion 37 side in the extending direction of the reference line in the disk radial direction.

In the inner side pad support portion 32A illustrated in FIG. 10 and the outer side pad support portion 36C illustrated in FIG. 8 both of which are on the disk entry side, the pad spring 26 illustrated in FIG. 1 is attached at a position of each of the support main body portions 70A and 70C. The pad spring 26 has a recessed guide portion 81C which is fitted into the support main body portion 70C illustrated in FIG. 8, an outward side covering portion 82C which is on the disk-radially outward side of the guide portion 81C and covers the surface 36Ca illustrated in FIG. 8, an inward side covering portion 83C which is on the disk-radially inward side of the guide portion 81C and covers the surface 36Cb illustrated in FIG. 8, a radial-direction biasing portion 84C which is on the disk-radially inward side of the inward side covering portion 83C and biases the brake pad 25 on the disk-axially outward side toward the disk-radially outward side, and a rotation-direction biasing portion 85C which extends from the guide portion 81C and biases the brake pad 25 on the disk-axially outward side to the disk exit side.

Although they are not illustrated, the pad spring 26 has a recessed guide portion which is fitted into the support main body portion 70A illustrated in FIG. 10, an outward side covering portion which is on the disk-radially outward side of this guide portion and covers the surface 32Aa, an inward side covering portion which is on the disk-radially inward side of this guide portion and covers 32Ab, a radial-direction biasing portion which is on the disk-radially inward side of this inward side covering portion and biases the brake pad 24 on the disk-axially inward side toward the outward side in the disk radial direction, and a rotation-direction biasing portion which extends from the guide portion and biases the brake pad 24 on the disk-axially inward side to the disk exit side.

Figure 7:
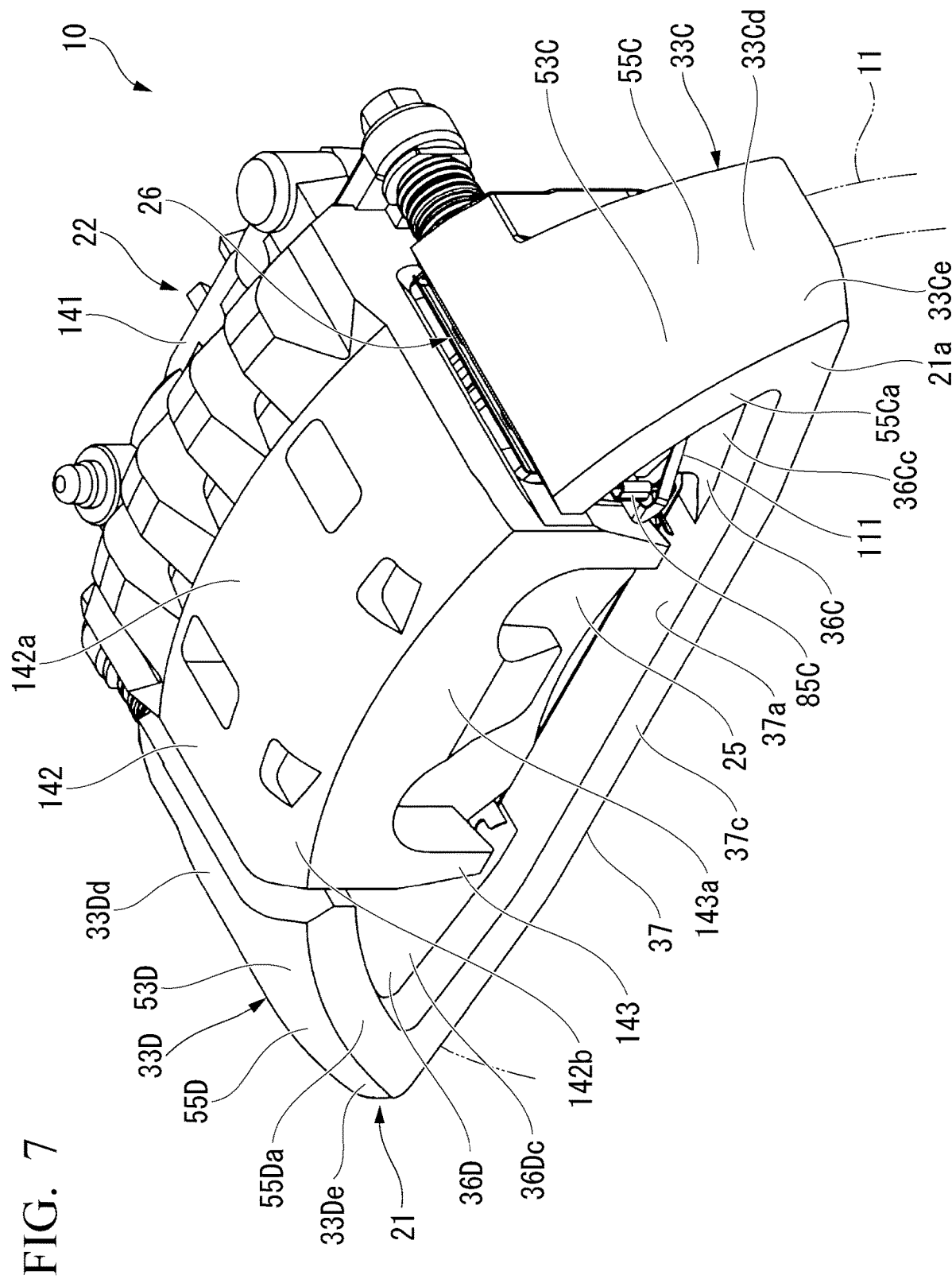
FIG. 7 is a perspective view illustrating the disk brake according to the embodiment of the present invention.

As illustrated in FIG. 7, the rotation-direction biasing portion 85C protrudes to the disk-axially outward side beyond the outward side end surface 36Cc on the disk-axially outward side of the outer side pad support portion 36C on the disk entry side. In addition, the rotation-direction biasing portion 85C is disposed on the disk-axially inward side from the outward side end surface 55Ca of the outer frame constituting portion 55C on the disk entry side. The pad spring 26 in its entirety is disposed on the disk-axially inward side from the outward side end surface 55Ca of the outer frame constituting portion 55C on the disk entry side. In other words, a position of the outward side end surface 55Ca of the outer frame constituting portion 55C in the disk axial direction is on a side outward in the disk axial direction from the rotation-direction biasing portion 85C of the pad spring 26. A position of the outward side end surface 55Da of the outer frame constituting portion 55D in the disk axial direction is also on a side outward in the disk axial direction from the rotation-direction biasing portion 85C of the pad spring 26. A position of the outward side end surface 37c of the coupling beam portion 37 in the disk axial direction is also on a side outward in the disk axial direction from the rotation-direction biasing portion 85C of the pad spring 26.

In the inner side pad support portion 32B illustrated in FIG. 10 and the outer side pad support portion 36D illustrated in FIG. 8 both of which are on the disk exit side, the pad spring 27 illustrated in FIG. 1 is attached at a position of each of the support main body portions 70B and 70D. The pad spring 27 has a recessed guide portion 81D which is fitted into the support main body portion 70D illustrated in FIG. 8, an outward side covering portion 82D which is on the disk-radially outward side of the guide portion 81D and covers the surface 36Da illustrated in FIG. 8, an inward side covering portion 83D which is on the disk-radially inward side of the guide portion 81D and covers the surface 36Db illustrated in FIG. 8, and a radial-direction biasing portion 84D which is on the disk-radially inward side of the inward side covering portion 83D and biases the brake pad 25 on the disk-axially outward side toward the outward side in the disk radial direction. A rotation-direction biasing portion for biasing the brake pad 25 to the disk exit side is not provided in the pad spring 27.

Although they are not illustrated, the pad spring 27 has a recessed guide portion which is fitted into the support main body portion 70B illustrated in FIG. 10, an outward side covering portion which is on the disk-radially outward side of this guide portion and covers the surface 32Ba, an inward side covering portion which is on the disk-radially inward side of the guide portion and covers the surface 32Bb, and a radial-direction biasing portion which is on the disk-radially inward side of this inward side covering portion and biases the brake pad 24 on the disk-axially inward side toward the outward side in the disk radial direction. A rotation-direction biasing portion for biasing the brake pad 24 to the disk exit side is not provided in the pad spring 27.

The pair of brake pads 24 and 25 illustrated in FIG. 2 are shared components. As illustrated in FIG. 1, the brake pad 25 on the disk-axially outward side is supported by the attachment member 21 via the pad springs 26 and 27. The brake pad 25 has a rear plate 91 which is supported by the attachment member 21, and a lining 92 which comes into contact with the disk 11 illustrated in FIG. 1.

As illustrated in FIG. 1, the rear plate 91 has a main plate portion 101, and a pair of projecting portions 102C and 102D which protrude from both end portions of the main plate portion 101 in a longitudinal direction to the outward side of the main plate portion 101 in the longitudinal direction. The lining 92 illustrated in FIG. 2 is bonded to the main plate portion 101.

As illustrated in FIG. 1, in the brake pad 25 on the disk-axially outward side, one projecting portion 102C of the rear plate 91 thereof is disposed inside the support main body portion 70C of the one outer side pad support portion 36C via the guide portion 81C of the corresponding pad spring 26, and the other projecting portion 102D of the rear plate 91 is disposed inside the support main body portion 70D of the other outer side pad support portion 36D via the guide portion 81D of the corresponding pad spring 27. Accordingly, the brake pad 25 on the disk-axially outward side is supported by the attachment member 21 so as to be able to move in the disk axial direction.

In the brake pad 25 on the disk-axially outward side, the main plate portion 101 of the rear plate 91 thereof is pressurized to the outward sides in the disk radial direction respectively by the radial-direction biasing portions 84C and 84D of the pad springs 26 and 27 abutting thereto. In addition, in the brake pad 25 on the disk-axially outward side, the projecting portion 102C of the rear plate 91 thereof is biased to the disk exit side by the rotation-direction biasing portion 85C of the pad spring 26 abutting thereto. Here, the attachment member 21 receives a force from the main plate portion 101 of the brake pad 25 at the time of braking of the surfaces 36Cb and 36Db adjacent to the disk-radially inward side with respect to the support main body portions 70C and 70D. In other words, in the attachment member 21, the surfaces 36Cb and 36Db on the disk-radially inward sides from the support main body portions 70C and 70D become torque receiving surfaces. The surface 36Db becomes a torque receiving surface at the time of forward movement of the vehicle, and the surface 36Cb becomes a torque receiving surface at the time of rearward movement.

A return spring 111 which abuts the outward side end surface 36Cc of the outer side pad support portion 36C on the disk entry side and generates a biasing force in the brake pad 25 to a side outward in the disk axial direction, that is, in a direction in which it separates further from the disk 11 is attached to the projecting portion 102C on the disk entry side of the rear plate 91 of the brake pad 25 on the disk-axially outward side.

As illustrated in FIG. 7, the return spring 111 protrudes to the disk-axially outward side beyond the outward side end surface 36Cc on the disk-axially outward side of the outer side pad support portion 36C on the disk entry side. In addition, the return spring 111 in its entirety is disposed on the disk-axially inward side from the outward side end surface 55Ca of the outer frame constituting portion 55C on the disk entry side. In other words, a position of the outward side end surface 55Ca of the outer frame constituting portion 55C in the disk axial direction is on a side outward in the disk axial direction from the return spring 111 in its entirety. A position of the outward side end surface 55Da of the outer frame constituting portion 55D in the disk axial direction is also on a side outward in the disk axial direction from the return spring 111 in its entirety. A position of the outward side end surface 37c of the coupling beam portion 37 in the disk axial direction is also on a side outward in the disk axial direction from the return spring 111 in its entirety.

As in the same manner, the brake pad 24 on the disk-axially inward side illustrated in FIG. 2 is also supported by the pair of inner side pad support portions 32A and 32B illustrated in FIG. 10 via the pad springs 26 and 27 so as to be able to move in the disk axial direction. Thus, the attachment member 21 has the pair of inner side pad support portions 32A and 32B and the pair of outer side pad support portions 36C and 36D which are attached to a non-rotation portion of the vehicle and movably support the pair of brake pads 24 and 25.

As illustrated in FIGS. 1, 2, and 7, the caliper 22 has an approximately mirror-symmetrical shape. As illustrated in FIG. 2, the caliper 22 includes a caliper body 131, the slide pins 45, and a piston (not illustrated).

The caliper body 131 is integrally formed through casting. The caliper body 131 has a cylinder portion 141 which is disposed on the disk-axially inward side with respect to the disk 11, a bridge portion 142 which extends to the disk-axially outward side in the disk axial direction in a manner of straddling an outer circumference of the disk 11 from the outward side of the cylinder portion 141 in the disk radial direction, a claw portion 143 which extends from a side opposite to the cylinder portion 141 to the inward side of the bridge portion 142 in the disk radial direction and is disposed on the disk-axially outward side of the disk 11, and a pair of pin attachment portions 144 which extend from the cylinder portion 141 to both sides in the disk circumferential direction. A cylinder bore for accommodating the piston (not illustrated) is formed in the cylinder portion 141.

In the caliper body 131, the slide pin 45 is attached to the pin attachment portion 144 on one side in the disk circumferential direction. The slide pin 45 is also attached to the pin attachment portion 144 on the other side in the disk circumferential direction. The pair of slide pins 45 on both sides of the caliper 22 illustrated in FIG. 2 in the disk circumferential direction are slidably fitted into the pair of pin insertion holes 43C and 43D illustrated in FIG. 10. Accordingly, the caliper 22 is supported by the attachment member 21 so as to be able to slide in the disk axial direction. The pair of boots 23 respectively cover parts of the corresponding slide pins 45 protruding from the attachment member 21.

As illustrated in FIG. 1, the caliper 22 in its entirety is positioned on the disk-radially outward side from the fixing portion 31 and the coupling beam portion 37 of the attachment member 21 in a state of being supported by the attachment member 21. In addition, in the caliper 22, as illustrated in FIG. 2, the bridge portion 142 and the claw portion 143 are disposed between the pair of support main body portions 53C and 53D in the disk circumferential direction in a state of being supported by the attachment member 21.

As illustrated in FIG. 1, a plurality of the recesses 151 (specifically, at two places) recessed outward in the disk radial direction from an end edge portion on the disk-radially inward side are provided in the claw portion 143. These recesses 151 have the same shape. The recesses 151 are arranged in the disk circumferential direction in a manner of being positionally aligned in the disk axial direction and the disk radial direction. One recess 151 is a part through which a tool for machining one cylinder bore (not illustrated) is inserted in the cylinder portion 141. The other recess 151 is a part through which a tool for machining the other cylinder bore (not illustrated) is inserted in the cylinder portion 141.

In the caliper body 131, an outer circumferential end surface 142a facing the disk-radially outward side is formed at the end portion of the bridge portion 142 on the disk-radially outward side. The outer circumferential end surfaces 33Cd and 33Dd on the disk-radially outward side of the outer circumferential frame portions 33C and 33D of the attachment member 21 and the outer circumferential end surface 142a on the disk-radially outward side of the caliper 22 are disposed with no step therebetween in the disk radial direction.

A chamfer 142b is formed at the end portion of the bridge portion 142 on the disk-radially outward side adjacent to the disk-axially outward side of the outer circumferential end surface 142a. The chamfer 142b is disposed at the end portion on the disk-axially outward side at the end portion of the caliper 22 on the disk-radially outward side. The chamfer 142b faces the disk-radially outward side and the disk-axially outward side. The chamfer 142b inclines so as to be positioned on the disk-radially inward side toward the disk-axially outward side. The chamfer 142b of the bridge portion 142 is positionally aligned with the chamfers 33Ce and 33De of the outer circumferential frame portions 33C and 33D of the attachment member 21 in the disk radial direction.

An outward side surface 142c (a disk-circumferentially outward side surface) facing the disk-circumferentially outward side is formed at the end portion of the bridge portion 142 on the disk entry side. An outward side surface 142d (a disk-circumferentially outward side surface) facing the disk-circumferentially outward side is formed at the end portion of the bridge portion 142 on the disk exit side.

In the attachment member 21, the one facing surface 33Ca of the pair of facing surfaces 33Ca and 33Da faces the outward side surface 142c of the pair of outward side surfaces 142c and 142d of the caliper 22. In the attachment member 21, the one outer circumferential frame portion 33C including this one facing surface 33Ca extends from this one facing surface 33Ca in a direction in which it separates further from the caliper 22 in the disk circumferential direction so as to cover the disk 11 while straddling the disk 11. In addition, in the attachment member 21, the other facing surface 33Da of the pair of facing surfaces 33Ca and 33Da faces the other outward side surface 142d of the pair of outward side surfaces 142c and 142d of the caliper 22. In the attachment member 21, the other outer circumferential frame portion 33D including the other facing surface 33Da extends from the other facing surface 33Da in a direction in which it separates further from the caliper 22 in the disk circumferential direction so as to cover the disk 11 while straddling the disk 11.

In the attachment member 21, the pair of outer circumferential frame portions 33C and 33D extend respectively from the corresponding facing surfaces 33Ca and 33Da in the disk circumferential direction to positions on the disk-radially inward sides beyond the surfaces 36Cb and 36Db which receive forces from the brake pad 25 at the time of braking of the pair of outer side pad support portions 36C and 36D. The outer circumferential frame portion 33C extends from the facing surface 33Ca thereof in the disk circumferential direction to a position on the disk-radially inward side beyond the surfaces 36Cb and 36Db of the pair of outer side pad support portions 36C and 36D, and the outer circumferential frame portion 33D extends from the facing surface 33Da thereof in the disk circumferential direction to a position on the disk-radially inward side beyond the surfaces 36Cb and 36Db of the pair of outer side pad support portions 36C and 36D.

That is, in the attachment member 21, the respective end portions of the outer circumferential end surface 33Cd of the outer circumferential frame portion 33C, the chamfer 33Ce, and the inner circumferential end surface 33Cf on the disk-radially inward sides are positioned on the disk-radially inward side from the respective end portions of the pair of surfaces 36Cb and 36Db on the disk-radially inward sides (the position of the long-and-short dashed line X indicated in FIGS. 1 and 8) in the extending direction of the reference line in the disk radial direction. In addition, in the attachment member 21, the respective end portions of the outer circumferential end surface 33Dd of the outer circumferential frame portion 33D, the chamfer 33De, and the inner circumferential end surface 33Df on the disk-radially inward sides are positioned on the disk-radially inward side from the respective end portions of the pair of surfaces 36Cb and 36Db on the disk-radially inward sides in the extending direction of the reference line in the disk radial direction.

As illustrated in FIG. 2, a plurality of window holes 161 (specifically, at two places) penetrating the bridge portion 142 in the disk radial direction are formed in the bridge portion 142 in a manner of being positionally aligned in the disk axial direction and separate further from each other in the disk circumferential direction. The window holes 161 are formed on the disk-axially inward side on the outer circumferential end surface 142a of the bridge portion 142. The window holes 161 are holes for visually recognizing a wear state and the like of the brake pads 24 and 25 on both sides in the disk axial direction from outside.

A plurality of recessed portions 162 (specifically, at two places) recessed from the outer circumferential end surface 142a to the disk-radially inward side are formed in the bridge portion 142 in a manner of being positionally aligned in the disk axial direction and separate further from each other in the disk circumferential direction. The recessed portions 162 are formed on the disk-axially outward sides from the window holes 161. The one recessed portion 162 is positionally aligned with the one window hole 161 in the disk circumferential direction, and the other recessed portion 162 is positionally aligned with the other window hole 161 in the disk circumferential direction. The pair of recessed portions 162 are parts supported by a working machine when the caliper body 131 is set in the working machine.

In the caliper body 131, an outward side end surface 143a (a disk-axially outward side end surface) facing the disk-axially outward side is formed at the end portion of the claw portion 143 on the disk-axially outward side. The outward side end surface 143a is disposed at the end portion of the caliper 22 on the disk-axially outermost side. The outward side end surface 143a has a flat surface shape spreading in a manner of being orthogonal to the disk axial direction.

When the outward side end surface 143a of the caliper 22 is positioned on the disk-axially outermost side, the position thereof in the disk axial direction coincides with that of the outward side end surface 21a of the attachment member 21. Alternatively, the outward side end surface 143a is positioned on a side inward in the disk axial direction from the outward side end surface 21a of the attachment member 21. At this time, in the outer frame constituting portions 55C and 55D constituting the outer frames of the support main body portions 53C and 53D in the outer circumferential frame portions 33C and 33D of the attachment member 21 and the coupling beam portion 37, positions of the outward side end surfaces 55Ca and 55Da thereof in the disk axial direction are the same as a position of the outward side end surface 143a of the caliper 22 or on a side outward in the disk axial direction from the outward side end surface 143a of the caliper 22. In addition, at this time, in the outer circumferential frame portions 33C and 33D of the attachment member 21, positions of the outward side end surfaces 33Ch and 33Dh thereof in the disk axial direction are the same as a position of the outward side end surface 143a of the caliper 22 or on a side outward in the disk axial direction from the outward side end surface 143a of the caliper 22.

Here, the foregoing positional relationship regarding the outward side end surface 143a of the caliper 22 with respect to the attachment member 21 is based on the premise that the disk brake 10 is in a state in which it is assembled in the vehicle and can be operated. Regarding the disk brake 10, when new brake pads 24 and 25 and a new disk 11 are used in this state, the outward side end surface 143a of the caliper 22 are positioned on the disk-axially outermost side. When the brake pads 24 and 25 and the disk 11 are new and are positioned on the disk-axially outermost side, the outward side end surface 143a of the caliper 22 satisfies the foregoing positional relationship with respect to the attachment member 21. For this reason, when the disk brake 10 is in a state in which it is assembled in the vehicle and can be operated, the foregoing relationship is satisfied at all times with respect to the attachment member 21.

In the disk brake 10, a brake fluid is introduced into the cylinder portion 141 of the caliper 22 via a brake piping (not illustrated). Consequently, in the caliper 22, a piston (not illustrated) moves forward to the disk 11 side, and the brake pad 24 on the disk-axially inward side disposed between the piston and the disk 11 is pressurized toward the disk 11. Accordingly, the brake pad 24 on the disk-axially inward side moves and comes into contact with the disk 11 in the lining 92. In addition, due to a reaction force of this pressurization, the caliper body 131 causes the slide pins 45 to slide with respect to the attachment member 21 and move in the disk axial direction, and the claw portion 143 pressurizes the brake pad 25 on the disk-axially outward side disposed between the claw portion 143 and the disk 11 toward the disk 11. Accordingly, the brake pad 25 on the disk-axially outward side comes into contact with the disk 11 in the lining 92. In this manner, the caliper 22 sandwiches the pair of brake pads 24 and 25 from both sides in the disk axial direction and pressurizes them against both surfaces of the disk 11. As a result, the caliper 22 applies a frictional resistance to the disk 11 and generates a brake force. The caliper 22 is a floating-type caliper and is a fist-type caliper.

The disk brake described in Patent Literature 1 has a structure in which a caliper pressurizing brake pads against a disk is movably supported in an attachment member supporting the brake pads. In this disk brake, the caliper protrudes to the disk-axially outward side beyond the attachment member. For this reason, snow is likely to enter the inside, and an influence of the snow is likely to be received.

In contrast, in the disk brake 10 of the embodiment, the attachment member 21 has the outer circumferential frame portions 33C and 33D which extend in the disk circumferential direction from the respective facing surfaces 33Ca and 33Da facing the outward side surfaces 142c and 142d of the caliper 22 on the disk-circumferentially outward side so as to cover the disk 11 while straddling the disk 11, and the coupling beam portion 37 which couples the outer side pad support portions 36C and 36D on the disk-axially outward sides to each other. In addition, the support main body portions 53C and 53D having the outer circumferential frame portions 33C and 33D and the coupling beam portion 37 as parts of the outer frames and forming the outer side pad support portions 36C and 36D are provided on the disk-axially outward side in the attachment member 21. Moreover, in the outer frame constituting portions 55C and 55D constituting the outer frames of the support main body portions 53C and 53D in the outer circumferential frame portions 33C and 33D and the coupling beam portion 37, positions of the outward side end surfaces 55Ca and 55Da on the disk-axially outward sides in the disk axial direction are the same as a position of the outward side end surface 143a of the caliper 22 on the disk-axially outward side or on a side outward in the disk axial direction from the outward side end surface 143a of the caliper 22 on the disk-axially outward side. Accordingly, even if snow enters the inside of a wheel, adhesion of the snow to the caliper 22 or the brake pad 25 on the disk-axially outward side can be curbed by the outer frame constituting portions 55C and 55D. Therefore, occurrence of malfunction caused when the brake pad 25 is stuck due to snow can be reduced.

In addition, the outer circumferential frame portions 33C and 33D extend from the facing surfaces 33Ca and 33Da in the disk circumferential direction to the positions on the disk-radially inward sides beyond the surfaces 36Cb and 36Db which receive forces from the brake pad 25 at the time of braking of the outer side pad support portions 36C and 36D. For this reason, the outer circumferential frame portions 33C and 33D cover the disk as an umbrella over a wide range in the disk circumferential direction. For this reason, even if snow enters the inside of a wheel, entry of the snow into the disk brake 10 can be effectively curbed. Therefore, occurrence of malfunction caused when the brake pad 25 is stuck due to snow can be further reduced.

In addition, the coupling beam portion 37 extends in the disk radial direction and is coupled to the outer circumferential frame portions 33C and 33D. For this reason, even if snow enters the inside of a wheel, adhesion of the snow to the brake pad 25 on the disk-axially outward side therebetween can be curbed. Therefore, an influence of snow can be further reduced.

In addition, the positions of the outward side end surfaces 55Ca and 55Da on the disk-axially outward sides of the outer frame constituting portions 55C and 55D in the disk axial direction are on sides outward in the disk axial direction from the rotation-direction biasing portion 85C protruding to a side outward in the disk axial direction from the outer side pad support portion 36C of the pad spring 26. For this reason, even if snow enters the inside of a wheel, coagulation of snow with respect to the rotation-direction biasing portion 85C of the pad spring 26 or collision of snow can be curbed. Therefore, deformation of the pad spring 26 due to snow or inhibition of a function can be reduced.

In addition, the outer circumferential end surfaces 33Cd and 33Dd on the disk-radially outward side of the outer circumferential frame portions 33C and 33D of the attachment member 21 and the outer circumferential end surface 142a on the disk-radially outward side of the caliper 22 are disposed with no step therebetween in the disk radial direction. For this reason, snow on a flow of air during traveling is guided to the outer circumferential end surface 142a of the caliper 22 from the outer circumferential end surfaces 33Cd and 33Dd of the outer circumferential frame portions 33C and 33D. Thus, snow is unlikely to be accumulated in a gap between the attachment member 21 and the caliper 22. Therefore, a situation in which the caliper 22 is stuck due to snow and is unlikely to float (slide) can be avoided.

A disk brake of a first aspect of the embodiment described above includes an attachment member that has support portions movably supporting a pair of brake pads and is attached to a non-rotation portion of a vehicle, and a caliper that is supported by the attachment member so as to be movable in a disk axial direction and pressurizes the brake pads against a disk. The attachment member has outer circumferential frame portions extending in a disk circumferential direction respectively from facing surfaces facing disk-circumferentially outward side surfaces of the caliper so as to cover the disk while straddling the disk, and a coupling beam portion coupling the support portions on disk-axially outward sides to each other. Support main body portions having the outer circumferential frame portions and the coupling beam portion as parts of outer frames and forming the support portions are provided on the disk-axially outward sides. In outer frame constituting portions constituting the outer frames of the support main body portions of the outer circumferential frame portions and the coupling beam portion, positions of disk-axially outward side end surfaces in the disk axial direction are the same as positions of the disk-axially outward side end surfaces of the caliper or on sides outward in the disk axial direction from the disk-axially outward side end surfaces of the caliper. Accordingly, an influence of snow can be reduced.

According to a second aspect, in the first aspect, the outer circumferential frame portions extend from the facing surfaces in the disk circumferential direction to positions on disk-radially inward sides beyond surfaces of the support portions receiving forces from the brake pads at a time of braking.

According to a third aspect, in the first or second aspect, the coupling beam portion extends in a disk radial direction and is coupled to the outer circumferential frame portions.

INDUSTRIAL APPLICABILITY

According to the foregoing disk brake, an influence of snow can be reduced.

REFERENCE SIGNS LIST

10 Disk brake
11 Disk
21 Attachment member
22 Caliper
24, 25 Brake pad
32A, 32B Inner side pad support portion (support portion)
33C, 33D Outer circumferential frame portion
33Ca, 33Da Facing surface
36C, 36D Outer side pad support portion (support portion)
37 Coupling beam portion
53C, 53D Support main body portion
55C, 55D Outer frame constituting portion
55Ca, 55Da Outward side end surface (disk-axially outward side end surface)
36Cb, 36Db Surface
70C, 70D Support main body portion
142c, 142d Outward side surface (disk-circumferentially outward side surface)
143a Outward side end surface (disk-axially outward side end surface)

The invention claimed is:

1. A disk brake comprising:
an attachment member that has support portions movably supporting a pair of brake pads and is configured to be attached to a non-rotation portion of a vehicle; and
a caliper that is supported by the attachment member so as to be movable in a disk axial direction and configured to pressurize the brake pads against a disk,
wherein the attachment member includes outer frame constituting portions covering a part of the disc,
wherein the outer frame constituting portions include outer circumferential frame portions and a coupling beam portion,
wherein each of the outer circumferential frame portions extend in the disk circumferential direction from respective facing surfaces of the outer circumferential frame portions that face disk-circumferentially outward side surfaces of the caliper while straddling and covering the disc,
wherein the coupling beam portion couples the support portions to each other at positions which are axially outward with respect to the disc,
wherein positions, in the disk axial direction, of disk-axially outward side end surfaces of the outer frame constituting portions are the same as a position of the disk-axially outward side end surface of the caliper, in the disk axial direction, or are more outward, in the disk axial direction, than the disk-axially outward side end surface of the caliper, and
wherein in a direction along a reference line in the disk radial direction which passes a central position of the attachment member in the disk circumferential direction and extends in the disk radial direction, the outer circumferential frame portions extend from positions of the facing surfaces to positions on the disk-radially inward sides beyond surfaces of the support portions, the surfaces receiving forces from the brake pad at the time of braking.

* * * * *